April 15, 1947.  A. J. DESIMONE  2,418,823
APPARATUS FOR MOLDING WIRE CORE TEMPLES
Filed Feb. 7, 1945  2 Sheets-Sheet 2
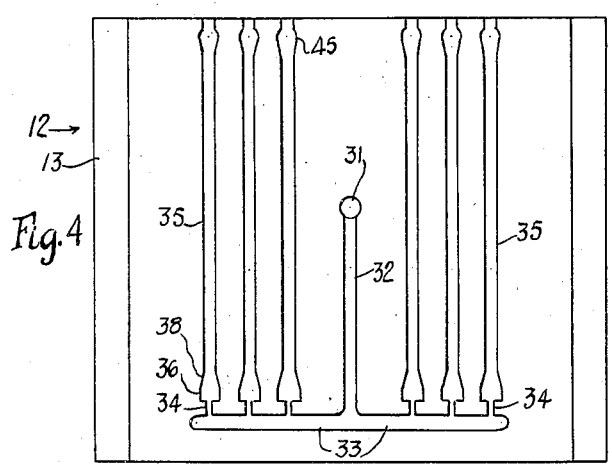
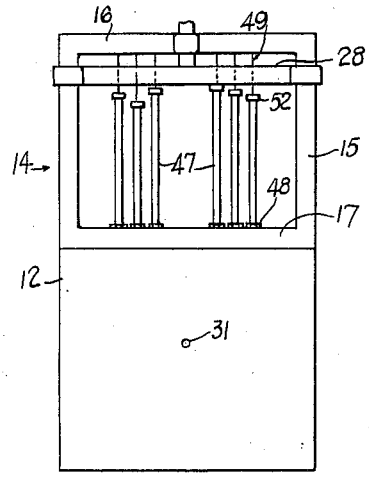
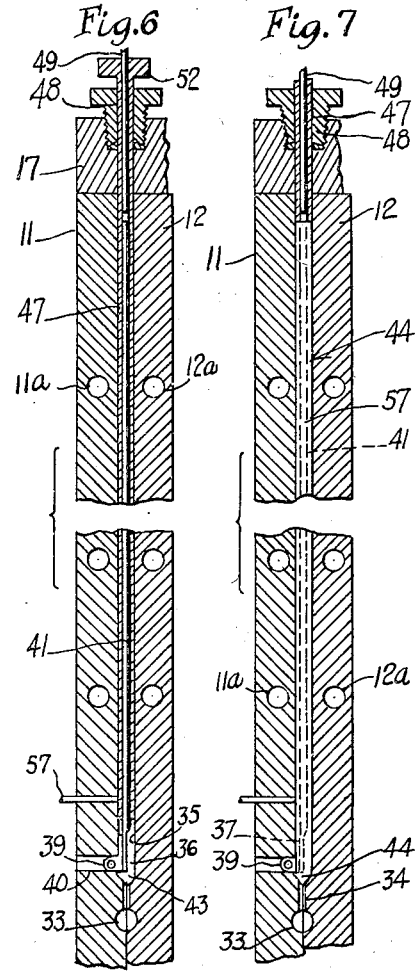
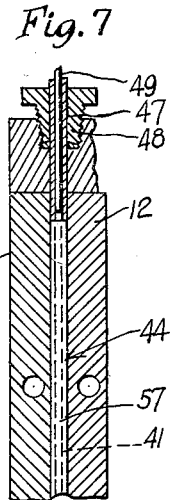
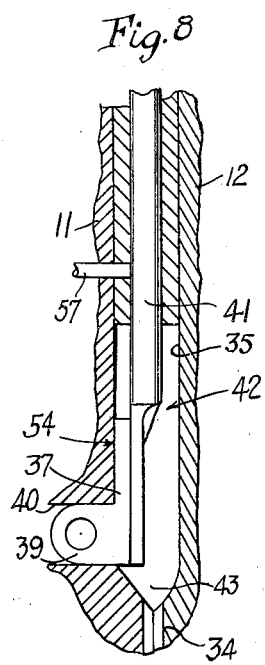
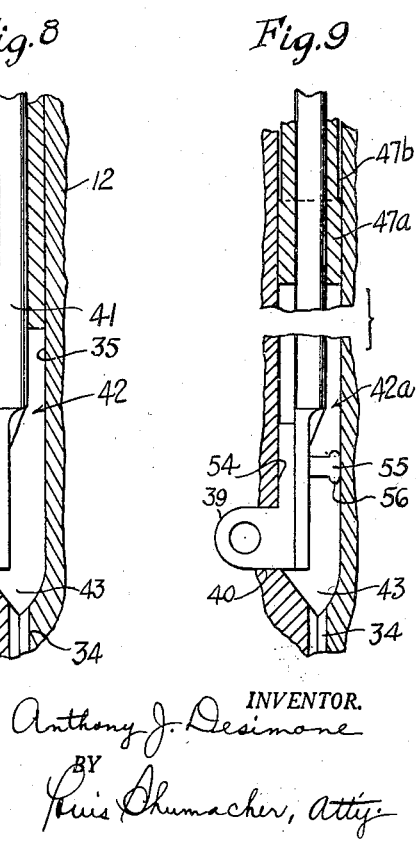
INVENTOR.
Anthony J. Desimone
BY
Louis Shumacher, Atty.

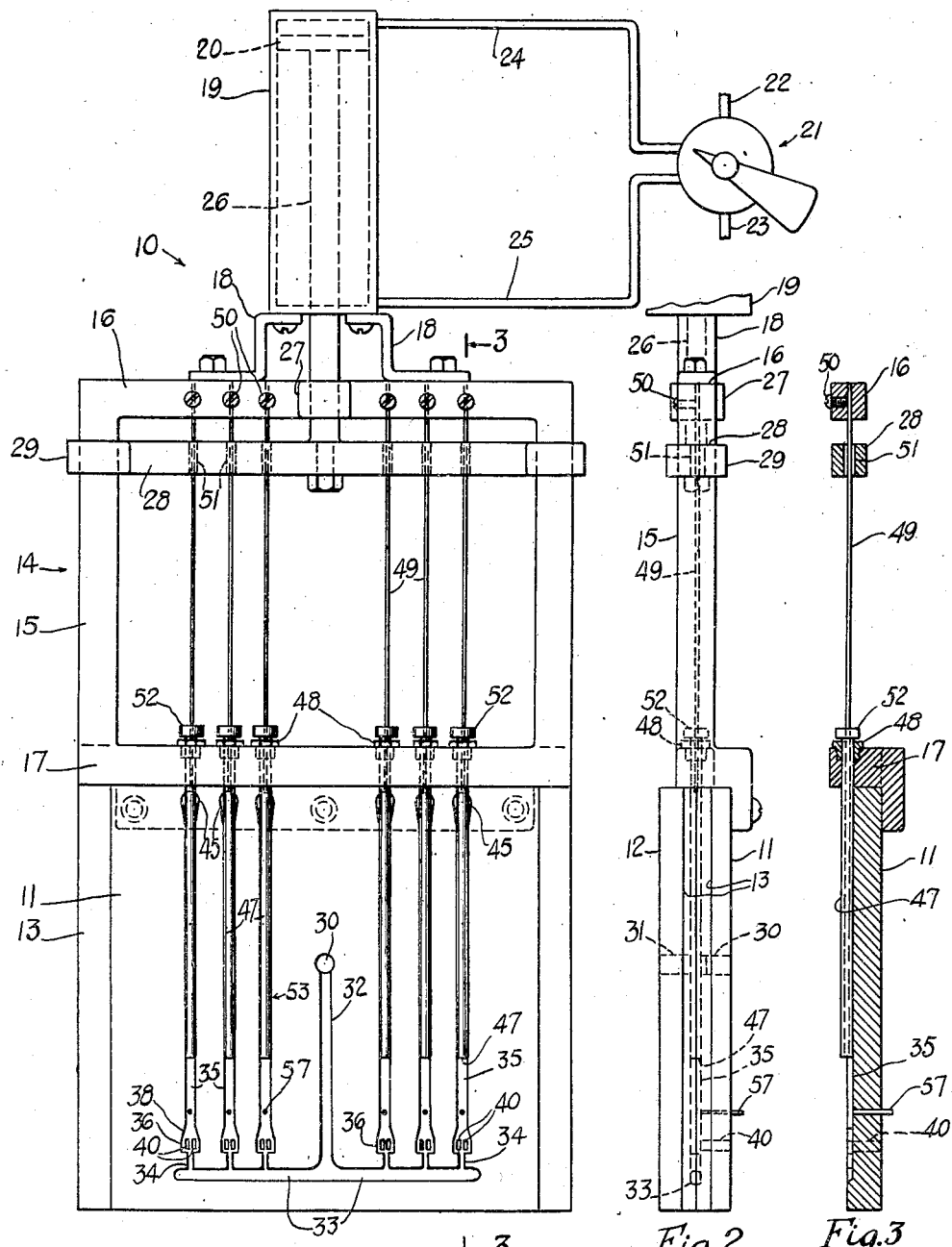

Patented Apr. 15, 1947

2,418,823

UNITED STATES PATENT OFFICE 2,418,823

APPARATUS FOR MOLDING WIRE CORE TEMPLES

Anthony J. Desimone, Lyndhurst, N. J., assignor to Columbia Protektosite Company, Inc., Carlstadt, N. J., a corporation of New Jersey Application February 7, 1945, Serial No. 576,675

3 Claims. (Cl. 18—36)

This invention relates to an apparatus for molding wire core temples. Certain related subject matter is disclosed in my patent application Serial No. 559,268 filed October 18, 1944, and the present application discloses improvements over my patent application Serial No. 574,055 filed January 23, 1945. Both of these patent applications may be regarded as incorporated herein by reference.

One object of the invention is to provide an improvement in the art of molding wire core temples, whereby the wire core is accurately centered.

Another object of the invention is to furnish improvements in the art whereby the molding of wire core temples is increased in speed, can be effected without unduly high injection pressures, and can be accomplished in a chilled mold without deviation of the wire core from its centered position.

Another object of the invention is the provision of improvements in the art whereby the gang molding of wire core temples is improved.

Another object of the invention is to provide improvements in the art whereby the plastic is molded along the hinge piece as well as about the wire core to directly produce a finished temple.

Another object of the invention is the provision of improvements in the art whereby certain individual handling of wire core, hinge piece and connecting rivets therefor is avoided, the wire core and hinge piece being interengaged for insertion as a unit into the mold.

Another object of the invention is to furnish improvements in the art for mounting a wire core in a mold cavity by utilizing the hinge piece.

Another object of the invention is to provide improvements in the art of molding wire core temples with their hinge pieces and preventing plastic from coating a certain face of the hinge piece to permit proper functioning of the hinge.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a view in front elevation of an apparatus embodying the invention, certain parts being diagrammatically shown, and one section of the mold being removed to clearly show the other.

Fig. 2 is a view in edge elevation, including the complete mold, with parts of the apparatus removed.

Fig. 3 is a section on line 3—3 of Fig. 1.

Fig. 4 is an inside or face view of the mold section removed in Fig. 1.

Fig. 5 is a front view on a reduced scale and with parts removed showing a step in the operation of the apparatus, as the molding of the temples is almost completed.

Fig. 6 is a full size central vertical section through a mold cavity with parts removed, and a tubular element increased in length, disclosing the method and apparatus as injection of plastic is about to begin.

Fig. 7 is a similar view but showing the wire core temple, with the tubular element in elevation and partly broken away.

Fig. 8 is an enlarged fragmentary sectional view of part of the apparatus shown in Fig. 6.

Fig. 9 is a similar view showing a modification.

The advantages of the invention as here outlined are best realized when all of its features and instrumentalities are combined, but, useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Generally described, the invention provides novel process and apparatus for producing superior wire core temples in less time and with less labor. A stamped, milled or cast hinge piece is mounted directly in the mold preferably by being first engaged with a wire core by means of prongs, rivets, or by soldering, welding or otherwise, to produce a detachably or permanently interconnected unit. This unit is very easily inserted into the die with the hinge ear received in an aperture in the mold wall to gage the position of the unit. The mold is provided with an expansible cavity or movable wall such as a slidable sleeve or tube into which the wire core is inserted as the unit is applied to the mold. Now the mold is closed and the tube is lowered and pushed downward at its external end. For economical manufacture, each mold has a gang of cavities, in which case all the tubes are pushed downward by a common member, and the plastic inlet is connected by gates to all the mold cavities. Upon injection, the several tubes are moved upward by the plastic in the manner of pistons, subject to their individual resistance and loading. These tubes centralize the wire cores and hold the hinge piece ear in its mold aperture with a face of the hinge piece pressed against a surface of the cavity to prevent deposit of plastic on said face. As the plastic rises it is gradually congealed by the water cooled mold so that the wire cores tend to become distorted by the forces exerted by the plastic, the centering tubes releasing more and more of the wire cores. It therefore appears to be desirable that the tubes shall offer a minimum of resistance to permit the plastic to fill the mold cavities as quickly as possible and while still highly fluid. The tubes must always remain in contact with the surface of the plastic to avoid possible entrapment of air, and their movement should be retarded only by the inherent resistance in the plastic and by ordinary sliding resistance in their mountings. With a gang of mold cavities each tube should move freely and independently of the others, as the resistance in the gates, mold cavities, etc. varies. Superior speed of molding is obtained and lower injection pressures may be used. When the temples are removed from the mold, the plastic encases not only the wire core but partially the hinge resulting in a neat structure, in which the plastic itself may be the permanent interconnection between the hinge piece and wire core, as where the latter were releasably interengaged to form the mentioned unit.

Referring in detail to the drawings, 10 denotes an apparatus embodying the invention and illustrating a process in accordance with the invention. The apparatus comprises a mold having mold sections or plates 11, 12 having clamping ledges or shoulders 13 and any water cooling passages such as 11a and 12a. Rigidly connected in any suitable manner to the mold plate 11 is a frame 14 of oblong shape, having parallel arms 15 and upper and lower cross bars 16, 17 respectively. Mounted on the bar 16 are brackets 18 carrying a motor such as a cylinder 19 having a piston 20 reciprocable by fluid or air pressure controlled by a conventional multi or four way valve 21. To the latter is connected a pipe 22 from a compressor (not shown), and an outlet pipe 23. Communicating the valve with the cylinder are conduits 24, 25 whereby pressure is supplied to the cylinder at either face of the piston to reciprocate the same. The timing of the reciprocation and dwell of the piston may be controlled by manual or automatic operation of the valve 21. Connected to the piston 20 is a rod 26 passing through a bearing 27 and carrying a cross head 28 slidably guided at 29 on the vertical members 15, for a purpose hereinafter described.

The mold plate 11 is provided with a gate or sprue puller 30, and the mold plate 12 is provided with an injection port 31 for the plastic. From these extends a gate 32 leading into branch gates 33, from which extend a plurality of passages or gates 34 communicating with the individual mold cavities 35, the several gates and mold cavities being split along the parting line of the mold. The cavities 35 are formed to the shape of the temple desired, and at their lower ends are formed with enlargements 36 to provide for the temple hinge pieces 37 and the desired flare of the plastic thereto as at 38. To receive the hinge ears 39, each mold cavity is formed with recesses or openings 40 in the mold plate 11, there being two such openings 40 if the hinge piece has two ears. Thus the location of the hinge piece is gaged, and if the wire core 41 is engaged with the hinge piece, the former is positioned at a proper elevation. If the hinge piece and wire core form a mechanical unit 42 for insertion as such into the mold, locating of the unit is greatly facilitated. Below the unit 42 is a mold section 43 to form a stop portion for the temple 44 shown in Fig. 7, with which the gate 34 directly communicates. At the upper end of the mold cavity, is an enlarged section 45 for molding the usual enlargement on the ear end of the temple. Intermediate of the sections 36 and 45, the mold cavities 35 are cylindrical.

Each mold cavity 35 is longitudinally expansible, as by the provision of a movable wall or tubular element 47 slidably fitted in the cylindrical portion of the mold cavity and slidably receiving the wire core 41 to thus centralize the same in the cavity. Suitable clearances are observed to facilitate an easy sliding motion without permitting leakage of the plastic past the tubular element. Such clearance may be increased by undercutting a tubular element 47a as 47b. The element is also slidable in a guide or bearing hole or stuffing box 48 in the cross bar 17, and is upwardly moved in the manner of a piston by the force of plastic flowing into its mold cavity. In its lowermost position the tubular element may be located as shown in Fig. 1, or lower as in Figs. 6 and 8, and in its uppermost position, it may be located as shown in Fig. 7; to guide the tubular element when it is thus substantially projected out of the mold, a wire 49 may be secured in a hole of the cross bar 16, by a set screw 50, the wire passing through a hole 51 in the cross head 28 so as to freely depend into the upper part of the tubular element 47 when the latter is in its fully lowered position. When the tubular element 47 is fully elevated, it disengages the wire core 41 as shown in Fig. 7 and receives the main part of the guide wire 49. Such guide wires are provided for all the tubular elements 47, and upward movement of the latter occurs while the cross head 28 is in its topmost position as in Fig. 1. Accordingly the upward rate of travel of the tubular elements may be different as shown in Fig. 5 so that certain of these elements do not retard or accelerate the movement of companion elements. To lower the tubular elements, the cross head 28 moves downwardly, impinging on the reenforcement heads 52 of the tubular elements. Such movement may be caused by release of air pressure below the piston 20, permitting the cross head to fall of its own weight.

The process herein involved will now be described. First a hinge piece 37 is constructed by milling, stamping or casting and detachably or permanently engaged or connected with a wire core 41 by soldered or welded joints or by prongs or rivets, as disclosed in my copending applications, to thus form a unit 42 which is easily and quickly inserted into the mold. During the insertion, the tubular elements 47 are preferably lowered to a point 53 in Fig. 1, by the cross head 28, and maintained in this position as by frictional engagement in the adjustable stuffing boxes 48 of the bar 17. This point 53 is above the lowermost position of the tubular elements 47 as in Fig. 1, and facilitates insertion of the wire cores 41 into these elements, after which the hinge ears 39 are pushed into the openings 40. Now the cross head 28 is lowered to move the tubular elements 47 to the molding position of Fig. 1, in which these elements may be retained in any suitable manner as by friction in the guides 48. Then the cross head is raised to the position shown, the mold is closed and injection of plastic is begun.

In this first stage of the process, as just described, the tubular element 47 centers the wire core 41 against deviation by the impact of plastic injected under relatively high pressure. A partial centering or positioning effect is also exerted by the hinge piece. The latter, by its ear 39 in opening 40 fixes the elevation of the unit 42. The wire core and hinge piece mutually contribute to positioning the unit 42 in a horizontal direction, and if the ear 39 is snugly frictionally held in the opening 40, the hinge piece accurately centers the adjacent part of the wire core, and the face 54 of the hinge piece (see Figs. 8 and 9) is snugly held against a surface of the mold to prevent plastic from depositing on that face and interfering with the range of motion of a complete spectacle hinge. Regardless whether the hinge ear 39 is frictionally held in the opening 40, the wire core 41, centered by the tubular element 47, holds the hinge piece with its face 54 against the adjacent surface of the mold, and such holding of the hinge piece may be increased by lowering the tubular element 47 to the position in Fig. 8 in which it is closer to the hinge piece. Also it may be increased by an initial slight bend or biasing of the wire core to increase the pressure at the face 54.

A supplemental aspect of the first phase of the process is illustrated in Fig. 9. Here the unit 42a differs from that at 42 in having a spacer 55 which more strongly positively presses the face 54 of the hinge piece against the mold wall than can be done by the wire core and tubular element, the pressure being exerted upon closing the mold. As disclosed in my copending applications above referred to, the spacer 55 may be variously produced as a prong, pin or projection, and as a part of the wire core or of the hinge piece or both, preferably integral therewith, and it forms a permanent part of the temple. In fact, it may be headed at 56 to securely anchor the hinge piece to the plastic portion of the temple. With a device such as 55, if the unit 42a is accurate and true, the tubular element may be located more remotely from the hinge piece than shown in Fig. 1, when injection of the plastic begins, since it may suffice for such element to center only the upper half of the wire core; in consequence, the plastic may rise more rapidly in the mold cavity.

According to the second phase of the process, the plastic is injected through the gates and into the mold cavities 35 forming a sheath 57 around the wire core as in Fig. 7 and partially embedding the hinge piece and the spacer 55, producing a permanent connection between the hinge piece and wire core if the engagement therebetween was releasable. As the plastic flows into the mold cavities 35, it elevates the tubular elements 47, meanwhile centering the wire core. Due to varying friction in the different gates and mold cavities, the rate of rise of the plastic varies. By having each tubular element 47 free or substantially free of the others, each rises at its own rate as shown in Fig. 5, without retardation or acceleration by the others, regardless of the loading of individual elements. Meanwhile the plastic is gradually congealing due to the preferably constantly cooled condition of the mold. Eventually the tubular elements, riding up the guide wires 49, pass the enlargements and release the wire cores 41, and come close to or in contact with the cross head 28. The mold is now opened, the temples being pushed out with the aid of ejector pins 57, and the plastic now being in semi hard condition rapidly setting.

As previously mentioned, small clearances are maintained between the tubular elements and the wire cores and between the former and the mold cavity surfaces, insufficient for leakage of the plastic. Such clearance reduces friction to a minimum, and while some friction may be maintained in the guides 48 it need be only sufficient to support the elements 47 in elevated or partially elevated position to facilitate insertion of units 42 and removal of the finished temples. Of course, the elements 47 may be individually loaded by higher friction or by weights at the heads 52, but the ideal condition herein contemplated is one where the rate of movement of the elements is determined almost solely by internal and external friction of the plastic material. In other words, the elements 47 oppose preferably little or negligable resistance to the plastic, such resistance, regardless of its amount, being desirably constant. Also the elements are in continuous contact at their lower ends with the plastic, avoiding entrapment of air, which may occur if one element is connected to another more rapidly rising element and thus moved out of contact with its plastic. There is no air compressed in the mold cavity by the advancing plastic.

Because the plastic is congealing while the tubular elements are moving upwardly, substantial internal resistances and stresses are created tending to deform portions of the wire cores out of center as the tubular elements pass and release those portions. Speed of manufacture, on the other hand, requires constant cooling of the mold. If the fluidity of the plastic can be maintained in substantial degree, deformation of the wire core is avoided. By reducing the resistance of the tubular elements, the plastic can quickly fill the mold cavities before any material increase of viscosity has occurred. Moreover injection pressure can be substantially reduced. And since each element is free of the others, its alinement is not subject to disturbance by the others.

It is thus seen that gang molding of temples is possible with a common gate and with common operation of the centering elements, the latter being nevertheless free to advance according to its local conditions and with maximum speed and accuracy, and with little or no deformation of the wire cores.

I claim:

1. Apparatus for molding wire core temples, including a gang mold having a plurality of temple forming mold cavities having a common injection port for feeding plastic thereinto at one end thereof, means at said end for holding wire cores in the cavities, the cavities having their other ends open, piston tubes for centering the wire cores slidably fitted in the cavities and each being movable to advanced position in relative proximity to the feed end of its cavity in which position the tube extends into the open end of the cavity, said tubes being adapted to be retracted out of the cavities as the molding of the temples is completed, individual means for releasably retaining the tubes in the retracted position, and common means for moving the tubes to advanced position, and being movable out of the path of the tubes to permit retraction thereof, the tubes being movable to retracted position substantially solely in response to the pressure of plastic that is being injected into the cavities with each tube retracting individually and offering relatively little resistance to the plastic so that the latter fills the cavities at low pressure therein.

2. Apparatus for molding wire core temples each having directly connected to its wire core a hinge piece having an outer face and a hinge ear thereon, including a gang mold having a plurality of temple forming mold cavities having a common injection port for feeding plastic into the cavities at one end of the mold, each cavity having adjacent to said end a lateral seat for said face of the hinge piece and the mold having recesses at said seats for freely removably receiving the hinge ears, the mold having at its other end individual openings for said cavities, piston tubes slidable in the cavities adapted to receive and center the wire cores, said tubes being movable in advanced position into relative proximity to the recesses and in said advanced position extending into the said openings, said tubes being retractible through said openings to leave the cavities when molding of the temples is completed, movable means for moving said tubes as a unit to advanced position, and being movable out of the path of said tubes to permit retraction of the latter, means for yieldingly engaging and maintaining the tubes in retracted position, said tubes being moved to retracted position solely by the plastic and offering relatively no resistance to the plastic so that the plastic fills the cavities at a relatively low pressure therein that is individual to the different cavities.

3. Apparatus for injection molding of wire core temples, including a mold having a temple forming cavity having at one end an inlet for plastic and being fully open at its other end, the mold having means adjacent to said inlet for securing a wire core for the temple, a piston tube slidably fitted in the cavity for movement to an advanced position in relative proximity to the inlet end of the cavity, said tube being of sufficient length to extend in said advanced position into the open end of the cavity, said tube being adapted to snugly, slidably receive and center the wire core for the temple, said tube being adapted to be retracted through said open end, and means solely at the open end of the cavity frictionally engaging the tube to retain the same in retracted position when the temple is being removed from the cavity, the piston tube being otherwise responsive substantially solely to the plastic injected into the cavity for its retraction movement, said cavity being enlarged adjacent to its open end to form a cross section of the cavity larger than that of said piston tube.

ANTHONY J. DESIMONE.

REFERENCES CITED

The following references are of record in the file of this patent:

UNITED STATES PATENTS

| Number | Name | Date |
|---|---|---|
| 391,198 | Chapuis | June 15, 1943 |
| 1,664,094 | Stevens | Mar. 27, 1928 |
| 2,197,465 | Burnetti | Apr. 16, 1940 |

FOREIGN PATENTS

| Number | Country | Date |
|---|---|---|
| 388,662 | British | Mar. 2, 1933 |

OTHER REFERENCES

A. P. C. Publication 391,198 of June 15, 1943.